(12) United States Patent
Wang

(10) Patent No.: US 7,321,836 B2
(45) Date of Patent: Jan. 22, 2008

(54) METHOD FOR DETERMINING THE EQUIVALENCY INDEX OF GOODS, PROCESSES, AND SERVICES

(75) Inventor: Eugene Y. Wang, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 92 days.

(21) Appl. No.: 10/888,777

(22) Filed: Jul. 9, 2004

(65) Prior Publication Data
US 2004/0254751 A1    Dec. 16, 2004

Related U.S. Application Data

(62) Division of application No. 10/164,519, filed on Jun. 6, 2002, now Pat. No. 6,789,031.

(51) Int. Cl.
G06F 19/00 (2006.01)
(52) U.S. Cl. ..................................... 702/81
(58) Field of Classification Search .............. 702/81
See application file for complete search history.

(56) References Cited

U.S. PATENT DOCUMENTS

| | | | | |
|---|---|---|---|---|
| 3,876,872 A | * | 4/1975 | Spitz .................. | 700/34 |
| 5,225,998 A | * | 7/1993 | Singhal ................ | 702/84 |
| 5,655,074 A | * | 8/1997 | Rauscher .............. | 714/38 |
| 6,931,329 B1 | * | 8/2005 | Terwilliger ............ | 702/27 |
| 2004/0064438 A1 | * | 4/2004 | Kostoff ................ | 707/1 |

OTHER PUBLICATIONS

Douglas C. Montgomery, "Introduction to Statistical Quality Control", John Wiley & Sons, Inc., Third Edition, 1996, pp. 1-31.

* cited by examiner

Primary Examiner—John Barlow
Assistant Examiner—Cindy D. Khuu
(74) Attorney, Agent, or Firm—Yingsheng Tung; Wade James Brady, III; Frederick J. Telecky, Jr.

(57) ABSTRACT

A method is disclosed wherewith a person skilled in the art of statistical quality control may determine whether a process, goods, or service is statistically equivalent to another of known quality, or to a desired target quality. The method may also be used to determine whether multiplicities of goods, processes, or services are statistically equivalent to one another and of a desired quality. The method makes the determination based on an equivalency index that is derived from integration of the probability distribution of data of measurement taken from products associated with the process, goods or services.

24 Claims, 5 Drawing Sheets

US 7,321,836 B2

METHOD FOR DETERMINING THE EQUIVALENCY INDEX OF GOODS, PROCESSES, AND SERVICES

This is a divisional application of Ser. No. 10/164,519 filed Jun. 6, 2002 now U.S. Pat. No. 6,789,031.

BACKGROUND OF THE INVENTION

1. Field of the Invention

This invention is related to field of statistical quality control and more specifically related to a method of determining an equivalency index of goods, processes and services.

2. Description of the Related Art

Every goods, process and service possess a number of parameters that jointly describe what the user thinks of as quality. These parameters are often called quality characteristics. Quality characteristics may be physical such as length, weight, voltage, and viscosity, or sensory such as taste, appearance, color, and ease of use, or time orientation such as reliability, and durability.

In the past, the buyers had to carry the burden of examining, judging, and testing goods for themselves. Competition in the market place has shifted the burden to the producers. The producers not only must screen out the non-conforming products before they reach the customers, they must continuously monitor their manufacturing processes for continuous quality improvement in order to compete.

To aid such endeavor, statistical tools have been developed. Today, it is common for the producers of goods such as automobile, computer, clothing, and its field service and provider of services such as generation and distribution of electrical energy, Internet services, telephone services, public transportation, banking, health, and accounting to adopt statistical quality control tools in their routine business and manufacturing operation. Such tools have become indispensable in their endeavor to compete for market share.

Among the tools that are prevalent among the practitioners of statistical quality control are the control chart, the Pareto diagram, the scatter plot, the histogram, the experimental design, and the acceptance sampling.

One common character of these tools is that they are most effective when used to correlate between characteristic quality parameters of a product, be it goods or service, and the input or process parameters that can affect the quality parameters. Practitioners use these tools to compare the variation of the quality parameters to the predetermined limits and to distinguish between common and special causes so as to understand and analyze the variation in the quality of a goods or service. Once the causes are identified, the information enables the practitioner to make necessary modification in order to control the effect and reduce the variation. These tools, however, have a common shortcoming.

In today's business environment, producers may be manufacturing their goods in many production sites, often in distant parts of the world. Service providers may also provide their products in many diverse geographical locations. Yet, the goods and service must be controlled to the same quality standard. A customer will expect the same quality of food and service from a restaurant in Tokyo, Japan as he receives in Quadalajara, Mexico if the restaurants bear the same name. A micro-controller chip maker in Taiwan who tries to qualify as a supplier to a German company must demonstrate that its chips meet the customer's specification and are equal, statistically speaking, to the parts the customer currently uses. The traditional statistical quality control methods and tools are less helpful for such purposes. When the issue concerns the degree of equivalency among a multiplicity of items of goods, processes, and services, it is difficult, with such tools, to reach an unambiguous conclusion readily and to express the conclusion as a concise numerical format.

BRIEF SUMMARY OF THE INVENTION

It is the object of this invention to provide a method with which a person of ordinary skill in the area of statistical quality control can determine whether a goods, process, or service is statistically equivalent to another of known quality.

It is also the object of this invention to provide a method with which a person of ordinary skill in the area of statistical quality control can determine whether a goods, process, or service is statistically equivalent to a required standard.

It is also the object of this invention to provide a method with which a person of ordinary skill in the area of statistical quality control can determine whether a multiplicity of goods, processes, or services are statistically equivalent to one another and of a desired quality.

Examples of such occasion are abundant: an owner or operator of a plant may need to judge the quality of a potential electricity supplier in terms of fluctuation of the supply voltage over time and compare that to the current supplier, an electronic system maker may need to judge the quality equivalency of the printed circuit board from a new vendors in terms of the thickness variation of the board in view of his production equipment specifications, other examples are the fill volume of soft drink beverage from various bottling machines, the net weight of a dry leach product from multiple production lines, the tensile strength of alternative new alloy materials for an automotive engine part, the time to failure of an electronic component from different vendors, or the results of many quality-control technicians measuring the surface finish of a metal parts.

DETAILED DESCRIPTION OF THE INVENTION

Figure 1:
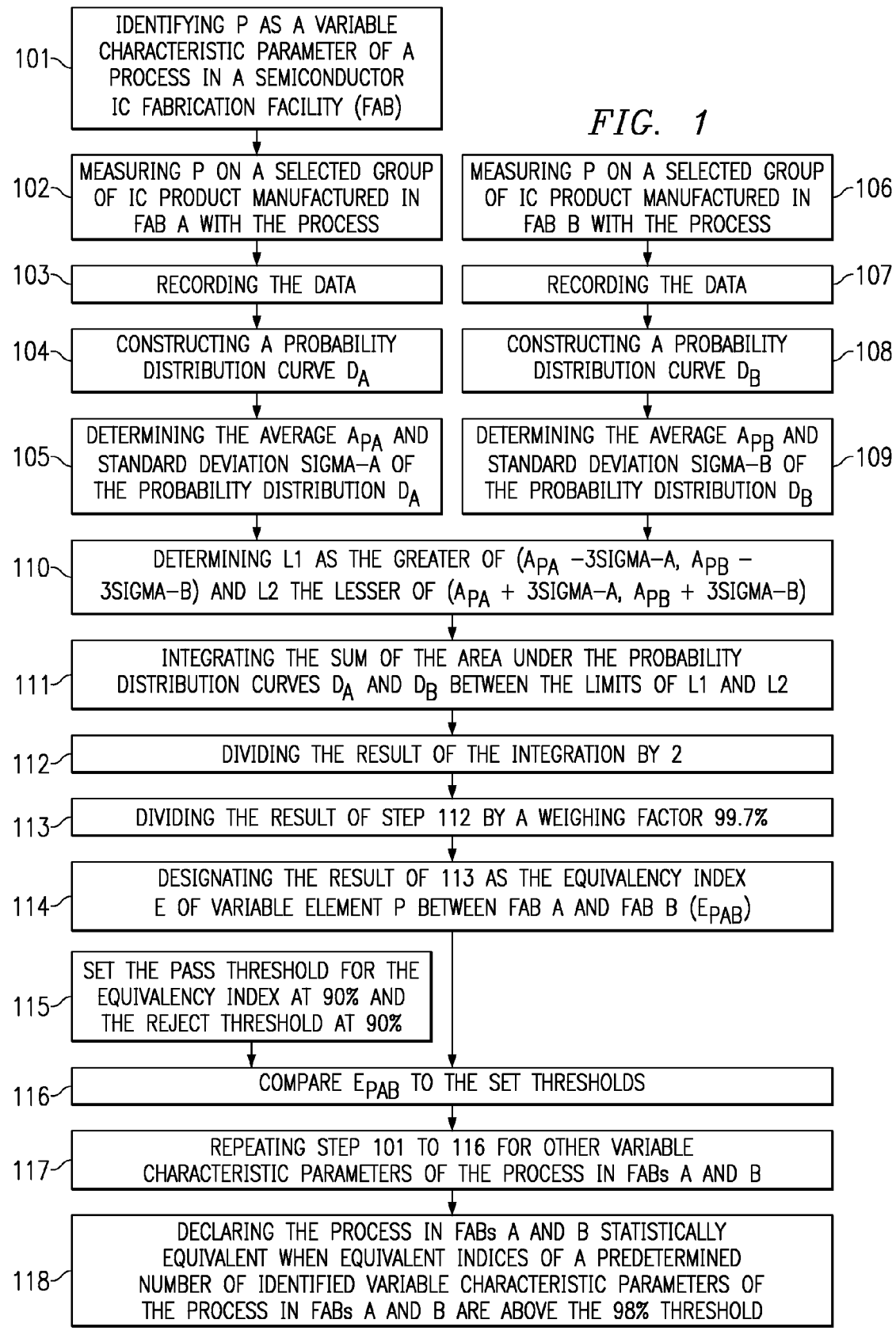
FIG. 1 depicts the steps of a method for declaring a process in two semiconductor IC fabrication facilities A and B (FABs A and B) to be equivalent in quality based on equivalency indices.

FIG. 1 depicts a specific example of the first embodiment of this invention, a method with which a semiconductor manufacturer may determine whether two of its integrated circuit (IC) manufacturing facilities (FABs) produce an IC product that is statistically equivalent. The two FABs may or may not have identical type and model of manufacturing equipment, they may or may not share identical recipe of manufacturing process. Although the method is illustrated with semiconductor IC product, this method can easily apply to other type of products. This method is also not limited to manufactured goods but can easily apply to services. What is required is a set of identifiable, measurable parameters that jointly describe what the user thinks of as quality of the product. A person skilled in the art of statistical quality control would be able to adopt this method to his or her own situation with equal effectiveness, regardless of which type of goods or service is being produced. This principle also applies to the other embodiment of this invention.

In step 101, the method requires one to identify one or more variable parameters that are characteristic of the IC manufacturing process, which can be measured from a product manufactured with the process. The number of parameters that are necessary to make this equivalency determination may be large or small, depending on the complexity of the process and the economy of the operation. In modern semiconductor integrated circuit products, one may choose among parameters related to a typical transistor in the integrated circuit, such as the transistor channel length, the gate oxide thickness, the drive current, gate to substrate leakage current etc.

In step 102, one takes measurements of an identified parameter in step 101, for instance, the transistor drive current from a group of IC products manufactured in a first facility, FAB A. The measurement may require hand probing by an operator if the desired sample size is small.

Otherwise, it may require an automated system that incorporates automated testing system for data acquisition and computer system for data crunching.

In step 103, one records the data from the measurements. Again, depending on the sample size, the recording may be in a laboratory notebook, a personal computer, or a fully automated system.

Figure 4:
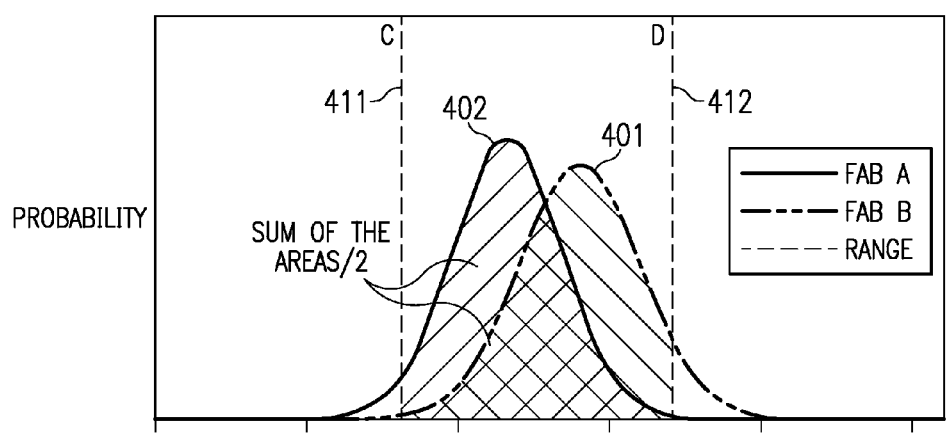
FIG. 4 depicts two probability distribution curves. One curve is generated from measurements taken from products of a semiconductor IC fabrication facility. FABs A the other curve is from PAB B.

In step 104, one constructs a probability distribution curve from the data recorded in step 103. Element 401 of FIG. 4 depicts such a distribution curve. Depending on the nature of the parameter, the data may form different types of distribution. The most common distribution is the normal distribution or the bell-curve distribution. Other types of distribution encountered in a typical manufacturing process include binomial, chi-square, t, F, exponential, gamma, Pascal, Poisson and Weibull distribution. The method described here works well with normal and other types of discrete and continuous distributions. In case the distribution does not conform to a commonly recognizable model, a person skilled in the art of statistical quality control will be able to use numerical method or graphical method in implementing the teaching disclosed in this invention.

In step 105, one extracts the average and the standard deviation from the probability distribution. The extraction may be accomplished manually or by a computer. It is familiar to a person skilled in the art of statistical quality control.

In step 106, 107, 108, and 109, one repeats the procedure of measurement and extraction on a group of products manufactured in a second facility, FAB B. FIG. 4, element 402 depicts a probability distribution curve from FAB B.

With the two curves showing in the same drawing, one can readily observe qualitatively the overlapping of the probability distribution. The more the two curves overlap, the more similar the products from of the two facilities are. The degree of the overlap of the curves, therefore, serves as a good indication of the equivalency of the two processes under comparison. The remaining of the method quantifies the equivalency by performing an integration of the probability distributions over a proper range.

In step 110, one chooses the range limits of the integration. In this example, the chosen limits are the three-sigma points of the two curves. The concept of three-sigma is familiar to a person skilled in statistical quality control. The upper limit of the integration is chosen to be the lesser of the two three-sigma points that are the upper limit of 99.7% inclusion of all data points under the curves. The lower limit is the greater of the two three sigma points that are the lower limit of 99.7% inclusion of all data point under the two curves. In FIG. 4, the upper and lower limits are designated as D, element 412, and C, 411 respectively.

In step 111, one carries out the integration of the sum of the two probability distribution functions. When the two distributions are normal distribution, the result of the integration lies between 2×99.7% and 2×0.3%. In a mathematical form the integration may be written as $$E_{PAB} = \left(\frac{1}{2}\int_C^D [f_A(x) + f_B(x)] dx\right) \Big/ 99.7\%$$

where $E_{PAB}$ is the equivalency index of the parameter P of FABs A and B, D is element 412 in FIG. 4, the upper three-sigma point of element 402, C is element 411 in FIG. 4, the lower three-sigma point of element 401, $f_A(x)$ is the probability distribution function of data from FAB A, element 401 in FIG. 4, $f_B(x)$ is the probability distribution function of data from FAB B, element 402 in FIG. 4.

In step 112, a division by a weighing factor of 2×99.7% normalizes the result of the integration to yield a number between 100% and less than 1%. The purpose of the normalization is for the ease of automation. Choice of other weighing factors is also possible. Otherwise, the normalization may also be omitted.

In step 114, this number is defined as the equivalency index of the parameter under test.

In step 115, one sets the thresholds to delineate the ranges of passing and failing of an equivalent index. In this example, passing is set at 98% and failing is set at 90%. These particular threshold values are chosen because according to the current semiconductor industry practice, when two probability curves plotting data generated form two groups of products, are within one sigma shift distant apart, the two groups of products are considered as not statistically significantly different from each other. If, however, the distance is more than a two-sigma shift, the two groups are considered to be significantly different. The threshold value of 98%, as shown in FIG. 5, conveniently corresponds to a one-sigma shift and the value of 90% is very closely corresponding to a two-sigma shift between the two probability distribution curves.

While there is a statistical base for choosing these threshold values, the method disclosed in this invention is equally effective with other choice of the threshold values based on other considerations such as custom or economy. Also, this step may be performed temporally independent of other steps in the method. If the same consideration applies for all the identified parameters under consideration, the same set of threshold values may be used. Otherwise, one may choose to use different threshold values for different parameters.

Figure 5:
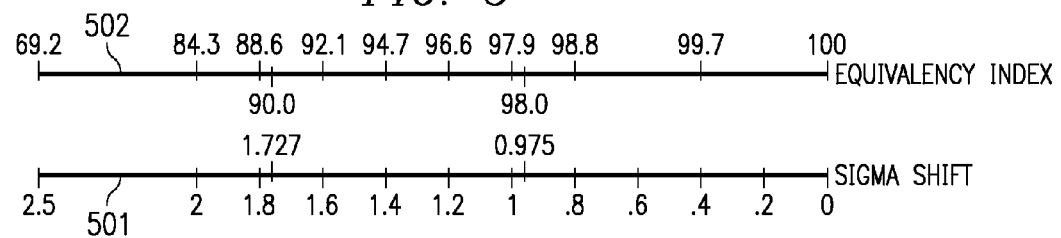
FIG. 5 depicts the passing and failing thresholds on an equivalency index scale and the corresponding scale measuring the separation between two probability distributions.

FIG. 5 depicts the relationship between values of an equivalency index and the corresponding shift of two probability distribution curves that generate the equivalency index. Element 501 depicts the scale of equivalency indices and element 502 depicts the scale of the corresponding shift.

In step 116, one compares the equivalency index $E_{PAB}$ to the ranges set in step 115. If $E_{PAB}$ is in the range above the upper threshold value of 98%, the passing range or a green zone, one would declare that FABs A and B are equivalent in quality with respect to parameter P. On the other hand, if $E_{PAB}$ is in the range below the lower threshold value of 90%, a failing range or a red zone, one would declare that FABs A and B are not equivalent in quality with respect to parameter P. An equivalency index that falls between 98% and 90%, or a yellow zone, usually calls for reviewing of the data and the procedure.

In step 117, the method requires a repeat of steps 102 to 106 for the remaining identified parameters.

In step 118, one declares that in regarding the product being tested, FABs A and B are equivalent in quality when the equivalency indices of the pre-identified set of parameters are all in the passing range.

Figure 2:
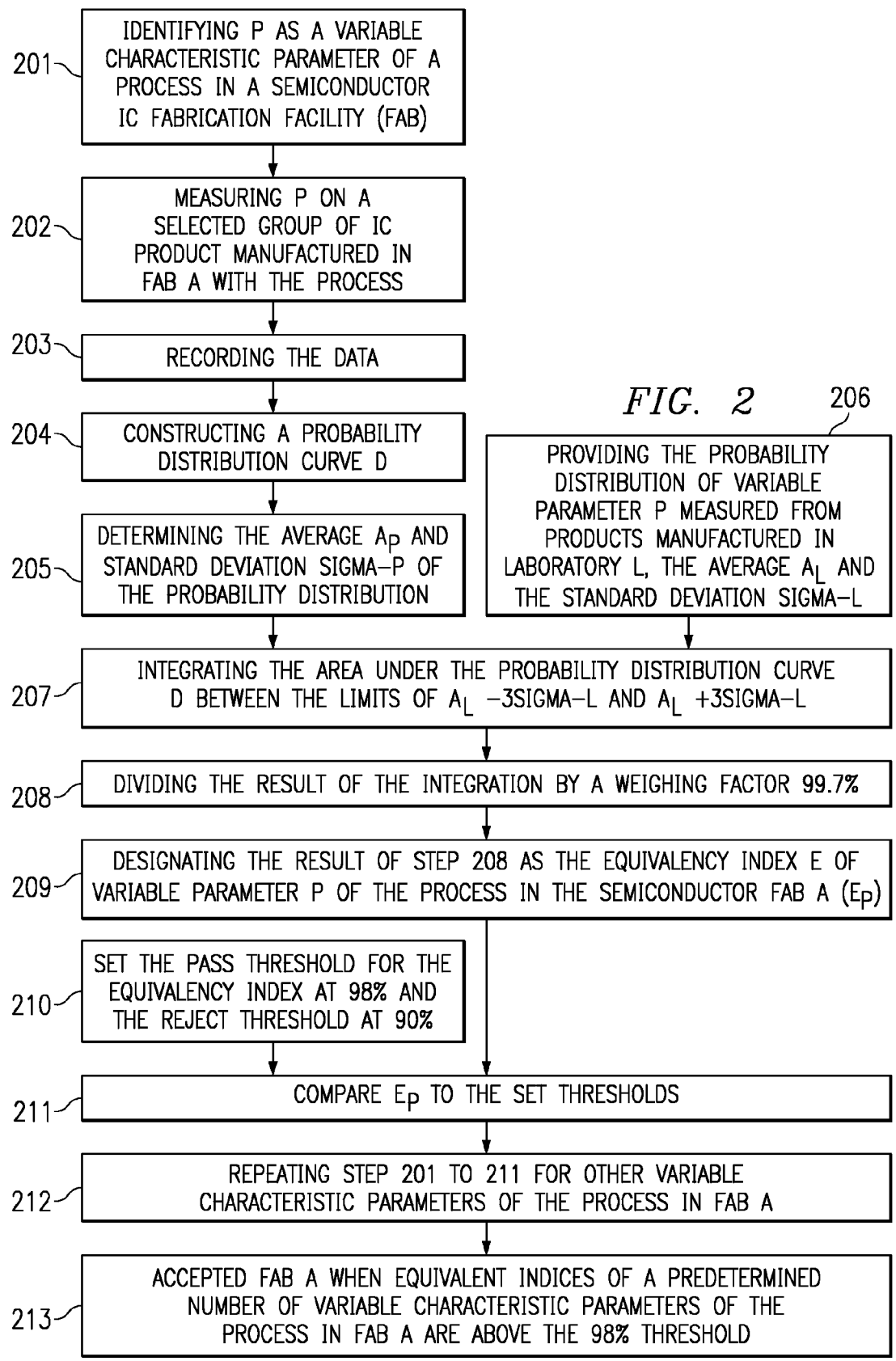
FIG. 2 depicts the steps of a method for declaring a process in a semiconductor IC fabrication facility as being equivalent in quality to a baseline process based on equivalency indices.

FIG. 2 depicts another embodiment of the invention, a method for determining whether a process in a semiconductor IC fabrication facility (FAB F) is equivalent in quality to a baseline process of another facility (LAB L) based on Equivalency Indices. The method is similar in many aspects to the method of FIG. 1. The main difference is that with this method, one compares a facility of unknown quality to a baseline process of known quality. A laboratory is used in this embodiment to provide the baseline process but the method applies equally well when the baseline of known quality is from an established manufacturing plant, or from results of computer simulation.

As with the method in FIG. 1, the generation of an equivalency index requires an integration operation, performed either manually or through a machine. Because the comparison is against a baseline of known quality, the limits of integration will be chosen to be the 3-sigma points of the baseline. If the products under test have a smaller standard deviation than that of the baseline process, it is possible for the equivalency index of the facility under test to be greater than 100%.

In step 201, the method requires one to identify one or more variable parameters that are characteristic of the IC manufacturing process and that can be measured from a product manufactured with the process. The number of parameters that are necessary to make this equivalency determination may be large or small, depending on the complexity of the process and the economy of the operation. In modern semiconductor integrated circuit products, one may choose among parameters related to a typical transistor in the integrated circuit, such as the transistor channel length, the gate oxide thickness, the drive current, gate to substrate leakage current etc.

In step 202, one takes measurements of an identified parameter in step 201, for instance, the transistor drive current from a group of IC products manufactured in a first facility. FAB F. The measurement may require hand probing by an operator if the desired sample size is small. Otherwise, it may require an automated system that incorporates automated testing system or data acquisition and computer system for data crunching.

In step 203, one records the data from the measurements. Again, depending on the sample size, the recording may be in a laboratory notebook, a personal computer, or a fully automated system.

Figure 6:
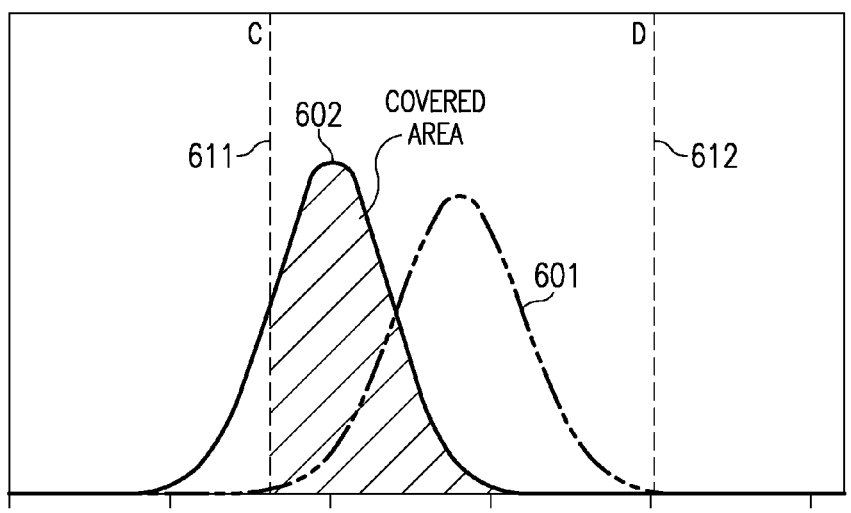
FIG. 6 depicts two probability distribution curves. the other curve is a baseline facility LAB L.

In step 204, one constructs a probability distribution curve from the data recorded in step 203. Element 601 of FIG. 6 depicts such a distribution curve. Depending on the nature of the parameter, the data may form different types of distribution. The most common distribution is the normal distribution or the bell-curve distribution. Other types of distribution encountered in a typical manufacturing process include binomial, chi-square, t, F, exponential, gamma, Pascal, Poisson and Weibull distribution. The method described here works well with normal and other types of discrete and continuous distributions. In case the distribution does not conform to a commonly recognizable model, a person skilled in the art of statistical quality control will be able to use numerical method or graphical method in implementing the teaching disclosed in this invention.

In step 205, one extracts the average and the standard deviation from the probability distribution. The extraction may be accomplished manually or by a computer. It is familiar to a person skilled in the art of statistical quality control.

In step 206, one provides the baseline process information. The baseline may be from a batch of prototype product fabricated in a laboratory as in this example. It may be information gathered from a production run of an established factory or it may be from computer simulation. What is required of the baseline process is a distribution curve with associated average and standard deviation against which the facility under test will be compared. A baseline distribution curve is depicted as element 601 in FIG. 6.

In step 207 one performs the integration of the distribution curve generated in step 204 and depicted as element 602 in FIG. 6. Note that the limits of integration C, element 611, and D, element 612 in FIG. 6 are the 3-sigma points of curve 601 of the baseline. The integration operation is usually performed by a machine. In simple cases, it may be performed manually.

In a mathematical form the integration may be written as $$Ep = (\int_C^D f_p(x) dx)/99.7\%,$$

where $E_p$ is the equivalent index of parameter P of FAB F, C and D are the 3-sigma points 611 and 612 of the probability distribution curve 601 in FIG. 6, $f_p(x)$ is the probability distribution function 602 in FIG. 6. 99.7% is a weighing factor that will be discussed in step 208.

In step 208, one normalizes the result of the integration. In this example, one uses a weighing factor of 99.7%. If the distribution under test matches the distribution of the baseline perfectly, the normalization would yield an number of 100%. The choice of 99.7% is a convenient one and it is consistent with the custom of current semiconductor industry practice. One may choose a weighing factor other than 99.7% or omit the normalization step without deviating from the teaching of this method.

In step 209, this number is defined as the equivalency index of the parameter under test.

In step 210, one sets the thresholds to delineate the ranges of passing and failing of an equivalent index. In this example, passing is set at 98% and failing is set at 90%.

These particular threshold values are chosen because according to the current semiconductor industry practice, when two probability curves plotting data generated form two groups of products, are within one sigma shift distant apart, the two groups of products are considered as not statistically significantly different from each other. If, however, the distance is more than a two-sigma shift, the two groups are considered to be significantly different. The threshold value of 98%, as shown in FIG. 5, conveniently corresponds to a one-sigma shift and the value of 90% is very closely corresponding to a two-sigma shift between the two probability distribution curves.

While there is a statistical base for choosing these threshold values, the method disclosed in this invention is equally effective with other choice of the threshold values based on other considerations such as custom or economy. Also, this step may be performed temporally independent of other steps in the method. If the same consideration applies for all the identified parameters under consideration, the same set of threshold values may be used. Otherwise, one may choose to use different threshold values for different parameters.

FIG. 5 depicts the relationship between values of an equivalency index and the corresponding shift of two probability distribution curves that generate the equivalency index. Element 501 depicts the scale of equivalency indices and element 502 depicts the scale of the corresponding shift.

In step 211, one compares the equivalency index $E_P$ to the ranges set in step 210. If $E_P$ is in the range above the upper threshold value of 98%, the passing range or a green zone, one would declare that FAB F is equivalent in quality to LAB L with respect to parameter P. On the other hand, if $E_P$ is in the range below the lower threshold value of 90%, a failing range or a red zone, one would declare that FAB F is not equivalent in quality to LAB L with respect to parameter P. An equivalency index that falls between 98% and 90%, or a yellow zone, usually calls for reviewing of the data and the procedure.

In step 212, the method requires one to repeat steps 201 to 211 for the remaining identified parameters.

In step 213, one declares that in regarding the product being tested, FAB F and LAB L are equivalent in quality when the equivalency indices of the pre-determined set of parameters all are in the passing range.

Figure 3:
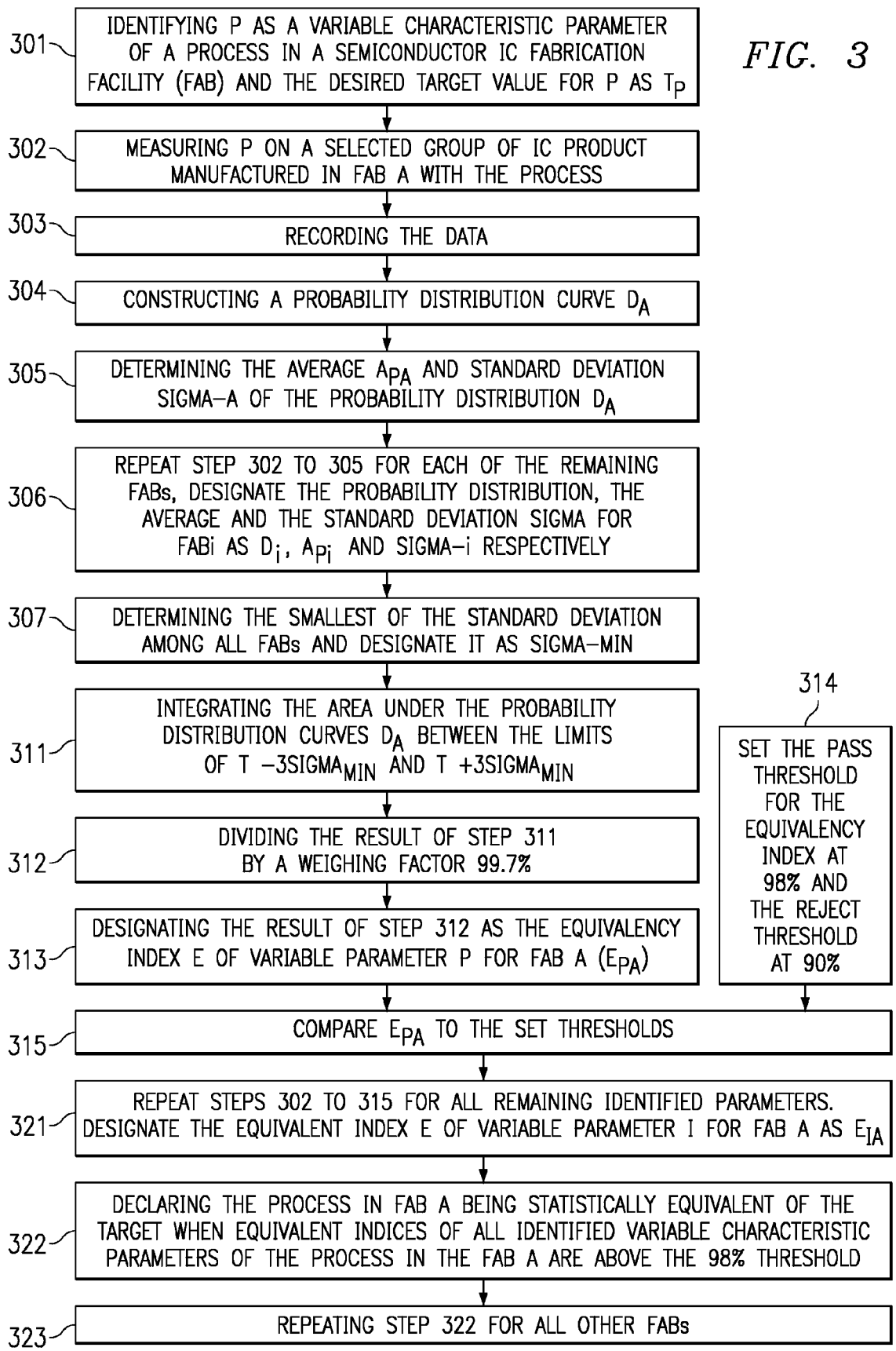
FIG. 3 depicts the steps of a method for declaring a plurality of semiconductor IC fabrication facilities as being equivalent in quality based on equivalency indices.

FIG. 3 depicts yet another embodiment of the invention, a method for determining, with respect to one particular manufacturing process that has been installed in a group of manufacturing facilities (FABs A, B, and C), which FABs are producing products that are equivalent in quality. The method is similar in many aspects as the method depicted in FIG. 1 and FIG. 2. In particular, like the method of FIG. 1, it does not require a baseline distribution except it does require a baseline target value for the parameter. But unlike the method of FIG. 1, it compares a plurality of facilities instead of two facilities. Like the method in FIG. 2, the integration limits are picked from one particular probability distribution instead of a combination of distributions.

In step 301, the method requires one to identify one or more variable parameters that are characteristic of the IC manufacturing process and that can be measured from a product manufactured with the process. The number of parameters that are necessary to make this equivalency determination may be large or small, depending on the complexity of the process and the economy of the operation. In modern semiconductor integrated circuit products, one may choose among parameters related to a typical transistor in the integrated circuit, such as the transistor channel length, the gate oxide thickness, the drive current, gate to substrate leakage current etc.

In step 302, one takes measurements of an identified parameter in step 301, for instance, the transistor drive current from a group of IC products manufactured in a first facility, FAB A. The measurement may require hand probing by an operator if the desired sample size is small. Otherwise, it may require an automated system that incorporates automated testing system for data acquisition and computer system for data crunching.

In step 303, one records the data from the measurements. Again, depending on the sample size, the recording may be in a laboratory notebook, a personal computer, or a fully automated system.

Figure 7:
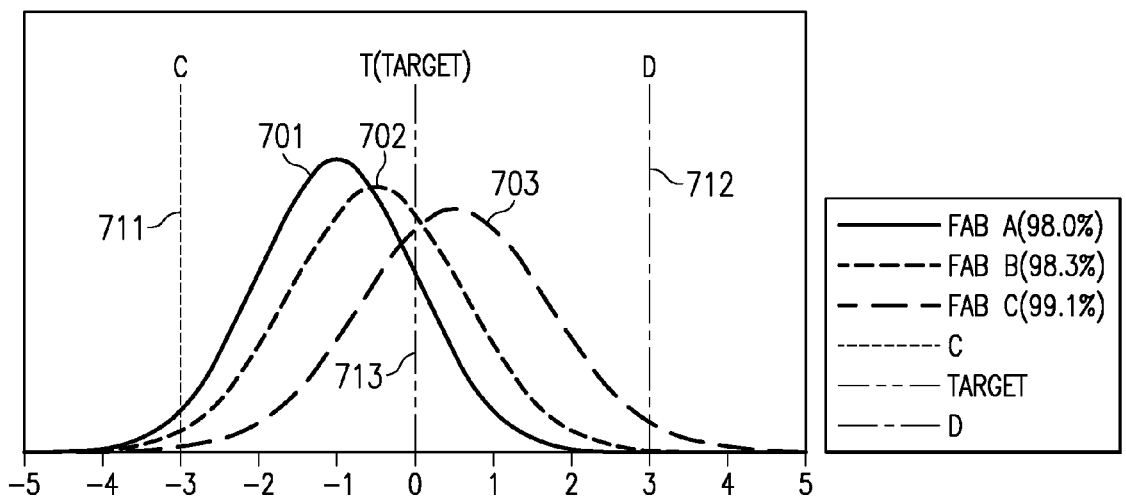
FIG. 7 depicts three probability distribution curves. One curve is generated from measurements taken from products of a semiconductor IC fabrication facility. FABs A, the second curve is from FAB B and the third curve is from FAB C. Also depicted is the target value T of the parameter.

In step 304, one constructs a probability distribution curve from the data recorded in step 303. Element 701 of FIG. 7 depicts such a distribution curve. Depending on the nature of the parameter, the data may form different types of distribution. The most common distribution is the normal distribution or the bell-curve distribution. Other types of distribution encountered in a typical manufacturing process include binomial, chi-square, t, F, exponential, gamma, Pascal, Poisson and Weibull distribution. The method described here works well with normal and other types of discrete and continuous distributions. In case the distribution does not conform to a commonly recognizable model, a person skilled in the art of statistical quality control will be able to use numerical method or graphical method in implementing the teaching disclosed in -his invention.

In step 305, one extracts the average and the standard deviation from the probability distribution. The extraction may be accomplished manually or by a computer. It is familiar to a person skilled in the art of statistical quality control.

In step 306, one repeats the steps 302 to 305 on products from FABs B and C.

In step 307, one compares the distributions of FABs A, B, and C to determine on one FAB of which the measured data have the smallest standard deviation. This sets the standard of variation against which all facilities will be judged. If, however, due to other consideration such as cost, an alternative standard is more desirable, the choice of such standard would not diminish the effectiveness of this method.

In step 311 one performs the integration of the distribution curves generated in step 304 and depicted as element 701 in FIG. 7. Note that the limits of integration C, element 711 and D, element 712 in FIG. 7 are related to the 3-sigma points of curve 701 that has the smallest standard deviation. The same limits C and D will be used in the integration of all other probability distribution functions of other FABs. The lower limit C, element 711, and the higher limit D, element 712 are set at $$C = T - 3 \times Sigma_{MIN};$$

$$D = T + 3 \times Sigma_{MIN},$$

where C is the lower limit of the integration 711, T is the target value for parameter P 713, $Sigma_{MIN}$ is the standard deviation of curve 701, and D is the upper limit of the integration, 712.

The integration operation is usually performed by a machine. In simple cases, it may be performed manually.

In a mathematical form the integration may be written as $$Epa = (\int_c^D [f_A(x)] dx)/99.7\%,$$

where $E_{pa}$ is the equivalent index of parameter P of FAB A, $f_A(x)$ is the probability distribution function 701, in FIG. 7 and 99.7% is the weighing factor and will be explained in step 312.

In step 312, a division by a weighing factor of 99.7% normalizes the result of the integration to yield a number between 100% and less than 1%. The purpose of the normalization is for the ease of automation. Choice of other weighing factors is also possible. Otherwise, the normalization may also be omitted.

In step 313, one designates the result of the integration and the normalization $E_{PA}$ as the equivalent index for parameter P of the FAB A under test.

In step 314, one sets the thresholds to delineate the ranges of passing and failing of an equivalent index. In this example, passing is set at 98% and failing is set at 90%. These particular threshold values are chosen because according to the current semiconductor industry practice, when two probability curves plotting data generated form two groups of products, are within one sigma shift distant apart, the two groups of products are considered as not statistically significantly different from each other. If, however, the distance is more than a two-sigma shift, the two groups are considered to be significantly different. The threshold value of 98%, as shown in FIG. 5, conveniently corresponds to a one-sigma shift and the value of 90% is very closely corresponding to a two-sigma shift between the two probability distribution curves.

While there is a statistical base for choosing these threshold values, the method disclosed in this invention is equally effective with other choice of the threshold values based on other considerations such as custom or economy. Also, this step may be performed temporally independent of other steps in the method. If the same consideration applies for all the identified parameters under consideration, the same set of threshold values may be used. Otherwise, one may choose to use different threshold values for different parameters.

FIG. 5 depicts the relationship between values of an equivalency index and the corresponding shift of two probabilty distribution curves that generate the equivalency index. Element 501 depicts the scale of equivalency indices and element 502 depicts the scale of the corresponding shift.

In step 315, one compares the equivalency index $E_{PA}$ to the ranges set in step 314. If $E_{PA}$ is in the range above the upper threshold value of 98%, the passing range or a green zone, one would declare that FAB A has achieved a satisfactory equivalency in quality with respect to parameter P. On the other hand, if $E_{PA}$ is in the range below the lower threshold value of 90%. a failing range or a red zone, one would declare that FAB A has not achieved such quality with respect to parameter P. An equivalency index that falls between 98% and 90%, or a yellow zone, usually calls for reviewing of the data and the procedure.

In step 321, one repeats the steps 302 to 315 for all remaining identified parameters.

In step 322, one declares that the FAB A has achieved the equivalency in quality with respect to the process under test and the quality is acceptable for the production of the product under test if all parameters from FAB A are in the green zone set in step 314.

In step 323, one repeats step 311 to 322 for all other FABs. Any FAB that has all its equivalency indices above the passing threshold values or in the green zone would be grouped among the FABs that would be qualified for the production of the product tested.

The disclosures and the description herein are purely illustrative and are not intended to be in any sense limiting. A person skilled in the art of statistical quality control would be able to apply the method disclosed in the above embodiments to his or her particular product. The product may be goods or services and the product may be the process itself.

What is claimed is:

1. A method for qualifying a first product based on an equivalency index associated with a characteristic parameter of the product, comprising:
   a. identifying at least one variable characteristic parameter of the first product;
   b. measuring said parameter on a group of the first product;
   c. recording the data of the measurement;
   d. constructing a first probability distribution from the data;
   e. repeat step b and c on a group of a second product, the second product being possessive of known desirable quality;
   f. deriving an average value and a standard deviation from the data taken from the second product;
   g. performing an integration of the first probability distribution over limits related to the average value and standard deviation;
   h. deriving an equivalency index of said variable characteristic parameter based on the result of the integration;
   i. setting a threshold value for the equivalency index;
   j. comparing the equivalency index to the set threshold value;
   k. declaring the first product as being of equivalent quality as the second product when the equivalency index of at least one identified characteristic parameter is not lower than the set threshold value.

2. The method of claim 1 wherein the product are goods of manufacture.

3. The method of claim 1 wherein the product is a service.

4. A method for qualifying a first process based on an equivalency index associated with a characteristic parameter of a product, the product being manufactured with the first process, comprising:
   a. identifying at least one variable characteristic parameter of a product manufactured with the first process;
   b. measuring said parameter on a first group of products manufactured with the first process;
   c. recording the data of the measurement;
   d. constructing a first probability distribution from the data;
   e. repeat step b and c on a second group of products, the second group of products being manufactured with a second process and the second process being of known desirable quality;
   f. deriving an average value and a standard deviation from the data taken from the second group of products;
   g. performing an integration of first probability distribution over limits related to the average value and the standard deviation;
   h. deriving an equivalency index of said variable characteristic parameter based on the result of the integration;
   i. setting a threshold value for the equivalency index;
   j. comparing the equivalency index to the set threshold value;
   k. declaring the first process as being of equivalent quality as the second process when the equivalency index of at least one identified characteristic parameter is not lower than the set threshold value.

5. The method of claim 4 wherein the process is for manufacturing a semiconductor integrated circuit.

6. The method in claim 4 wherein the product is a semiconductor integrated circuit.

7. A method for qualifying a product based on an equivalency index associated with a characteristic parameter of the product, comprising:
   a. identifying at least one variable characteristic parameter of the product;
   b. measuring said parameter on a group of the products;
   c. recording the data of the measurement;
   d. constructing a first probability distribution from the data;
   e. providing a desired target average value and a desired standard deviation value;
   f. performing an integration of the first probability distribution over limits related to the desired target average value and the desired standard deviation value;
   g. deriving an equivalency index of said variable characteristic parameter based on the result of the integration;
   h. setting a threshold value for the equivalency index;
   i. comparing the equivalency index to the set threshold value;
   j. declaring the product as being of quality meeting the average and standard deviation targets when the equivalency index of at least one identified characteristic parameter is not lower than the set threshold value.

8. The method in claim 7 wherein the product are goods of manufacture.

9. The method in claim 7 wherein the product is a service.

10. A method for qualifying a first process based on an equivalency index associated with a characteristic parameter of a product, the product being manufactured with the first process, comprising:
    a. identifying at least one variable characteristic parameter of a product manufactured with said process;
    b. measuring said parameter on a first group of products manufactured with said process;
    c. recording the data of the measurement;
    d. constructing a first probability distribution from the data of the measurements;
    e. providing a desired target average value and a desired standard deviation value;
    f. performing an integration of the first probability distribution over limits related to the desired target average value and the desired standard deviation value;
    g. deriving an equivalency index of said variable characteristic parameter based on the result of the integration;
    h. setting a threshold value for the equivalency index;
    i. comparing the equivalency index to the set threshold value;
    j. declaring the first process as being of quality meeting the average and standard deviation targets when the equivalency index of at least one identified characteristic parameter is not lower than the set threshold value.

11. The method in claim 10 wherein the process is a process for manufacturing a semiconductor integrated circuit.

12. The method in claim 10 wherein the product is a semiconductor integrated circuit.

13. A method for declaring two products, a first product and a second product, as being equal, based on an equivalency index associated with a characteristic parameter common to the two products, comprising:
    a. identifying at least one variable characteristic parameter common to the two products;
    b. measuring said parameter on a group of the first product;
    c. recording the data of the measurement;
    d. constructing a first probability distribution from the data;
    e. determining a first average value and a first standard deviation of said first probability distribution;
    f. repeating steps b through c with a group of the second product;
    g. constructing a second probability distribution from the data of measurements taken from the group of the second product;
    h. determining an second average value and a second standard deviation of the second probability distribution;
    i. performing an integration of the sum of the two probability distributions over limits related to the first and second average values and the first and second standard deviations;
    j. deriving an equivalency index of said variable characteristic parameter based on the result of the integration;
    k. setting a threshold value for the equivalency index;
    l. comparing the equivalency index to the set threshold value;
    m. declaring said two products as being equivalent in quality when the equivalency index of at least one identified characteristic parameter is not lower than the set threshold.

14. The method in claim 13 wherein the two products are goods of manufacture.

15. The method in claim 13 wherein the two products are services.

16. A method for declaring two processes, a first process and a second process, as being equal, based on an equivalency index associated with a characteristic parameter to a product manufactured with the two processes, comprising:
    a. identifying at least one variable characteristic parameter of the product, the product being manufactured with the two processes;
    b. measuring said parameter on a first group of the product, the first group of the product being manufactured with the first process;
    c. recording the data of the measurement;
    d. constructing a first probability distribution from the data in step c;
    e. determining a first average value and a first standard deviation of said first probability distribution;
    f. repeating steps b and c on a second group of the product, the second group of the product being manufactured with a second process;
    g. constructing a second probability distribution from the data taken from the second group of product;
    h. determining an second average value and a second standard deviation of said second probability distribution;
    i. performing an integration of the sum of the two probability distributions over limits related to the first and second average values and the first and second standard deviations;
    j. deriving an equivalency index of said variable characteristic parameter based on the result of the integration;
    k. setting a threshold value for the equivalency index;
    l. comparing the equivalency index to the set threshold value;

m. declaring said two facilities as possessive of said process of equivalent quality when the equivalency index of at least one identified characteristic parameter is not lower than the set thresholds.

17. The method of claim 16 wherein the two processes are for manufacturing a semiconductor integrated circuit.

18. The method of claim 16 wherein the product is a semiconductor integrated circuit.

19. A method for declaring a plurality of products as being equivalent in quality, based on an equivalency index associated with a characteristic parameter common to the plurality of products, comprising:
  a. identifying at least one variable characteristic parameter common to the plurality of products;
  b. measuring said parameter on a group of a first product of the plurality of products;
  c. recording data of the measurement;
  d. constructing a first probability distribution from the data;
  e. determining a first standard deviation of said first probability distribution;
  f. repeating steps b and c on a group of a second product of the plurality of products;
  g. constructing a second probability distribution from the data;
  h. determining a second standard deviation of said second probability distribution;
  i. repeating steps f and g for the remaining of the plurality of products;
  j. providing a desired target value for said parameter;
  k. integrating the first probability distribution over a pair of limits, the pair of limits being related to the desired target value;
  l. deriving an equivalency index of said variable characteristic parameter based on the result of the integration;
  m. setting a threshold value for the equivalency index;
  n. comparing the equivalency index to the set threshold value;
  o. repeating steps k, l, and n for each of the remaining plurality of products;
  p. declaring each of the plurality of products as having achieved the equivalency in quality and the quality being satisfactory when at least one equivalency index associated with the each of the plurality of products is not lower than the set threshold value.

20. The method of claim 19 wherein the plurality of products are goods of manufacture.

21. The method of claim 19 wherein the plurality of products are services.

22. A method for declaring a plurality of processes as being equivalent in quality, based on an equivalency index associated with a characteristic parameter of a product manufactured with said processes, comprising:
  a. identifying at least one variable characteristic parameter of the product manufactured with said processes;
  b. measuring said parameter on a first group of products, the products being manufactured with a first process of the plurality of processes;
  c. recording data of the measurement;
  d. constructing a first probability distribution from the data;
  e. determining a first standard deviation of said first probability distribution;
  f. repeating steps b and c on a second group of products, the second group of products being manufactured with a second process of the plurality of processes;
  g. constructing a second probability distribution from the data;
  h. determining a second standard deviation of said second probability distribution;
  i. repeating steps f through h for the remaining of the plurality of processes;
  j. providing a desired target value for said parameter;
  k. integrating the first probability distribution over a pair of limits, the pair of limits being related to the desired target value;
  l. deriving an equivalency index of said variable characteristic parameter based on the result of the integration;
  m. setting a threshold value for the equivalency index;
  n. comparing the equivalency index to the set threshold value;
  o. repeating steps k, l, and n for each of the remaining plurality of processes;
  p. declaring each of the plurality of processes as having achieved the equivalency in quality and the quality being satisfactory when at least one equivalency index associated with the each of the plurality of processes is not lower than the set threshold value.

23. The method in claim 22 wherein the plurality of processes is for making semiconductor integrated circuits.

24. The method of claim 22 wherein the product is a semiconductor integrated circuit.

* * * * *